Nov. 20, 1962         A. C. K. NIHLEN ETAL         3,064,506
            GROOVING TOOL FOR FINNED HEAT EXCHANGER TUBES
Filed Jan. 7, 1959                                  3 Sheets-Sheet 1

INVENTORS
Arvid C. K. Nihlen
Melvin G. Yohn
BY Frease & Bishop
ATTORNEYS

Nov. 20, 1962 A. C. K. NIHLEN ETAL 3,064,506
GROOVING TOOL FOR FINNED HEAT EXCHANGER TUBES
Filed Jan. 7, 1959 3 Sheets-Sheet 2

INVENTORS
Arvid C. K. Nihlen
Melvin G. Yohn

BY Frease & Bishop

ATTORNEYS

Nov. 20, 1962     A. C. K. NIHLEN ETAL     3,064,506
GROOVING TOOL FOR FINNED HEAT EXCHANGER TUBES
Filed Jan. 7, 1959     3 Sheets-Sheet 3
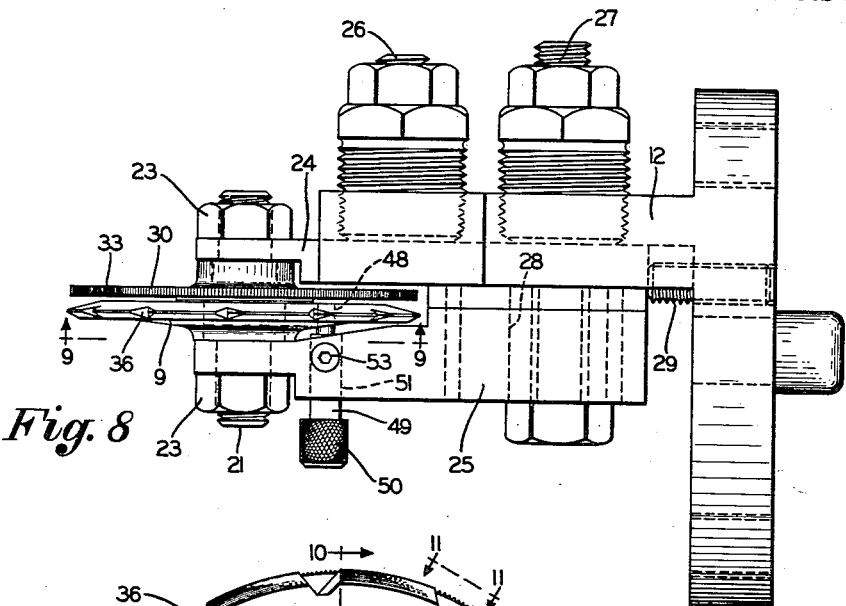
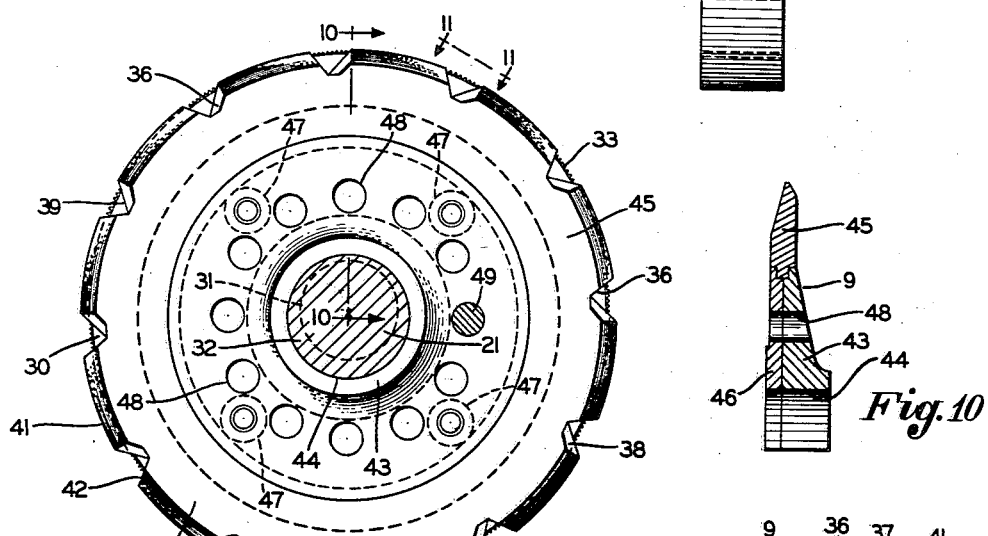
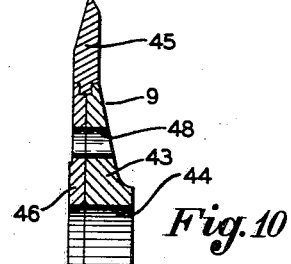
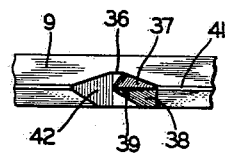
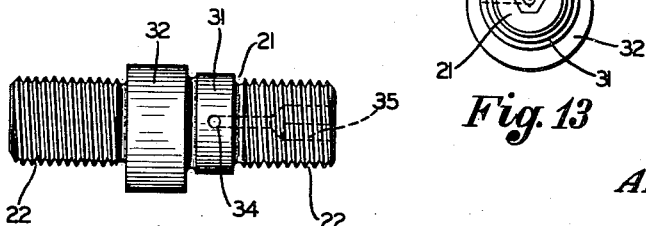
INVENTORS
Arvid C. K. Nihlen
Melvin G. Yohn
BY Frease & Bishop
ATTORNEYS United States Patent Office 3,064,506
Patented Nov. 20, 1962

3,064,506
GROOVING TOOL FOR FINNED HEAT
EXCHANGER TUBES
Arvid C. K. Nihlen, Massillon, and Melvin G. Yohn,
Canton, Ohio, assignors, by mesne assignments, to
Baldwin-Lima-Hamilton Corporation, Philadelphia, Pa.,
a corporation of Pennsylvania
Filed Jan. 7, 1959, Ser. No. 785,347
2 Claims. (Cl. 78—1)

This invention relates to the manufacture of finned tubing and pertains more particularly to an improved device for making this product. The invention constitutes improvements upon certain constructions shown in United States Patents Nos. 2,004,388 and 2,661,526.

One method of securing a helical fin on the external surface of a tube is to mount the tube on a machine of the lathe type having adjustable tool heads. The surface of the tube is grooved for subsequent insertion of one edge of a coiled metal ribbon that serves as the fin. Thereafter the edges of the walls forming the groove are rolled into firm contact with the side walls of the fin.

It has been prior practice to make the groove in the surface of the tube by a cutting or grooving tool bit mounted on the tool head of the lathe type machine as shown in said Patent No. 2,004,388. At frequent intervals, however, a tool bit becomes worn and out of shape due to the continuous use. As a result, the tool bit must be removed and resharpened or replaced, causing an unnecessary delay in production.

Another type of grooving tool used in the past has been a grooving disk which penetrates the surface of the tube and rotates therewith during the grooving operation such as shown in Patent No. 2,661,526. It has been found that the grooving disk like the tool bit must be replaced frequently in order to maintain the proper depth and shape of groove. Under such circumstances the grooving disk has proven to be a difficult tool bit to maintain in proper operating condition.

In addition to providing the surface of a tube with a properly shaped groove, it is necessary that the groove be of a proper depth so that there will be a satisfactory heat exchange contact between the walls of the groove in the tube and the surfaces of the metal fin which is subsequently inserted in the groove. Heretofore no satisfactory means for gauging the depth of the groove has been provided, which means may also be used for varying the depth of cut by minute manipulations of the depth disk in conjunction with the grooving member.

The device of the present invention overcomes the difficulties of the prior art by providing a notched grooving disk which replaces the conventional tool bit or grooving disk. The disk of the present invention is provided with a plurality of spaced notches, each of which notches is provided with at least one grooving edge which when it becomes worn from use is easily and rapidly replaced by a similar notch on the same disk without the necessity of removing the disk from its position on the tool post. In this manner the replacement of the cutting edge may be made expeditiously and thereby minimize the down time of the lathe.

In addition, the notched grooving disk of the present invention is preferably used in conjunction with a depth gauge disk which is mounted on a different center to permit variations in the adjustment of the depth of cut of the grooving disk. In this manner the disk may be quickly adjusted to vary the depth of the groove within a few thousandths of an inch. Thus when starting to cut a groove on a tube of a different diameter and/or wall thickness than the tube of a prior operation, it is possible to experiment within close limits in order to obtain the proper depth of cut commensurate with the wall thickness and diameter of the tube.

Accordingly, it is a general object of the present invention to provide a novel and improved grooving tool for finned heat exchanger tubes of the type described which eliminates the indicated disadvantages of prior grooving bits and disks.

It is another object of this invention to provide an improved grooving tool which includes a plurality of spaced groove-cutting edges to enable quick replacement of a worn cutting edge by a new cutting edge.

It is another object of this invention to provide a new grooving tool having a depth gauge disk for limiting the depth of cut of the grooving disk.

It is another object of this invention to provide a new grooving tool which is mounted on an eccentric shaft with respect to the depth gauge disk and thereby permits fine adjustments in the depth of cut.

It is another object of this invention to provide an improved grooving tool which is usable over longer periods of time to provide a more uniform depth and shape of groove in a heat exchange tube and therefore provides a product having more uniform characteristics.

Finally, it is an object of this invention to provide an improved grooving disk which accomplishes the foregoing objects and desiderata in a simple and effective manner.

These and other objects and advantages apparent to those skilled in the art from the following description and claims may be obtained, the stated results achieved, and the described difficulties overcome by the discoveries, principles, apparatus, parts, elements, combinations, and subcombinations which comprise the present invention, the nature of which is set forth in the following general statement, a preferred embodiment of which—illustrative of the best mode in which applicants have contemplated applying the principles—is set forth in the following description and shown in the drawings, and which is particularly and distinctly pointed out and set forth in the appended claims forming part hereof.

Generally, the improved grooving tool for finned heat exchanger tubes of the present invention may be stated in general terms as including a grooving disk mounted on a shaft substantially parallel to the axis of the tube being grooved, the grooving disk having a plurality of preferably equally spaced notches on the periphery thereof, which notches are provided with bevelled grooving surfaces engageable with the tube surface, a depth gauge disk mounted on the shaft and engageable with the surface of the tube, the periphery of the depth gauge disk being spaced radially inwardly of the grooving disk peripherally at the location of the contact of the disks with the tube by a distance equal to the depth of the groove, the depth gauge disk being mounted on an axis spaced from that of the grooving disk, the shaft being mounted on a tool support of a lathe, the grooving disk having a number of apertures radially inwardly of and equal to the number of grooving notches, and a stop pin detachably mounted in one of the apertures for holding the grooving tool fixedly on the shaft during the grooving operation.

In the drawings, in which a preferred embodiment of the invention is shown by way of example:

FIG. 8 is a plan view showing the manner in which the grooving disk and depth gauge disk are mounted on the tool post of the lathe;

FIG. 9 is an elevational view of the grooving disk, taken on the line 9—9 of FIG. 8;

FIG. 10 is a vertical sectional view, taken on the line 10—10 of FIG. 9;

FIG. 11 is a fragmentary enlarged view, taken on the line 11—11 of FIG. 9;

FIG. 12 is an elevational view of the disk-mounting shaft; and

FIG. 13 is an end view of the disk-mounting shaft showing the eccentric surfaces on which the disks are mounted.

Similar numerals refer to similar parts throughout the drawings.

Figure 1:
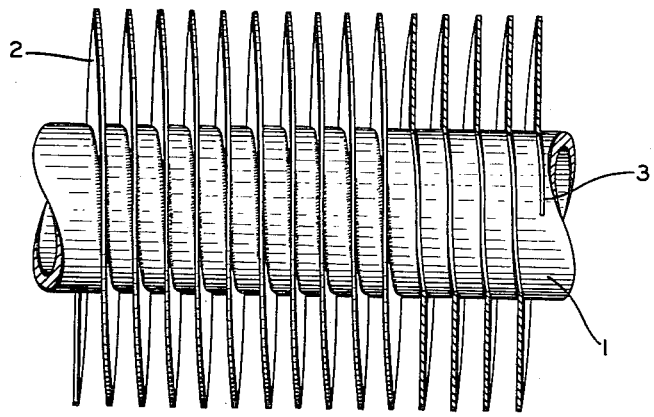
FIGURE 1 is a view of a portion of a finned heat exchanger tube.
Figures 2, 3:
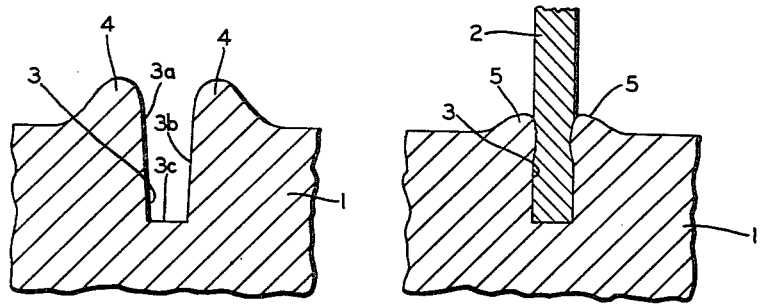
FIG. 2 is a fragmentary longitudinal sectional view of the tube showing the shape of the groove prior to insertion of the fin therein.
FIG. 3 is a fragmentary sectional view showing a groove after a fin is inserted therein.

A finned heat exchanger tube is shown at 1 in FIG. 1. The tube 1 has a continuous spiral fin 2 mounted thereon, which fin has its inner or root edge seated in a groove or furrow 3 which is provided in the outer surface of the tube. The shape of the groove 3 prior to insertion of the fin 2 is shown in FIG. 2. The grooving operation consists of furrowing the surface of the tube 1 by a plowing action whereby the metal of the tube is displaced laterally and outwardly to form ridges 4 on the outer surface of the tube 1 and on opposite sides of the groove 3. In other words, the metal forming the tube is displaced and not severed from contact with the tube.

In FIG. 3 the tube 1 is shown with the fin 2 intact within the groove 3. When the fin 2 is placed within the groove 3, the ridges 4 (FIG. 2) are displaced by roller pressing the metal radially inwardly forming the ridges 4 tightly into contact with the opposite sides of the fin 2 to form ridges 5 as shown in FIG. 3. In this manner the fins 2 are held tightly in heat exchange contact within the groove 3.

Figure 5:
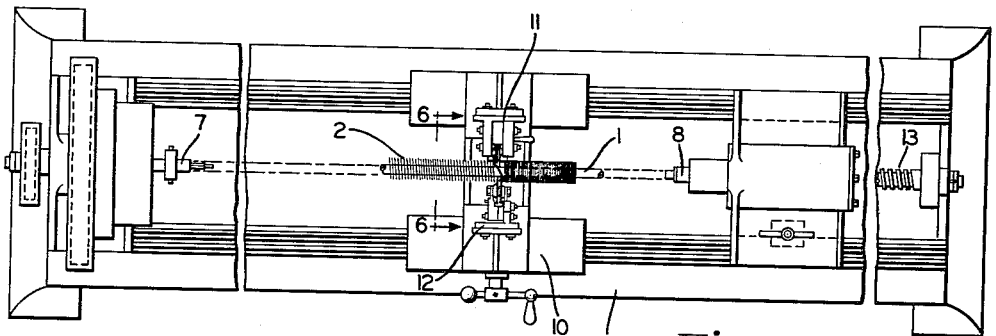
FIG. 5 is a plan view of a tube mounted on a lathe for the finning operation.
Figure 6:
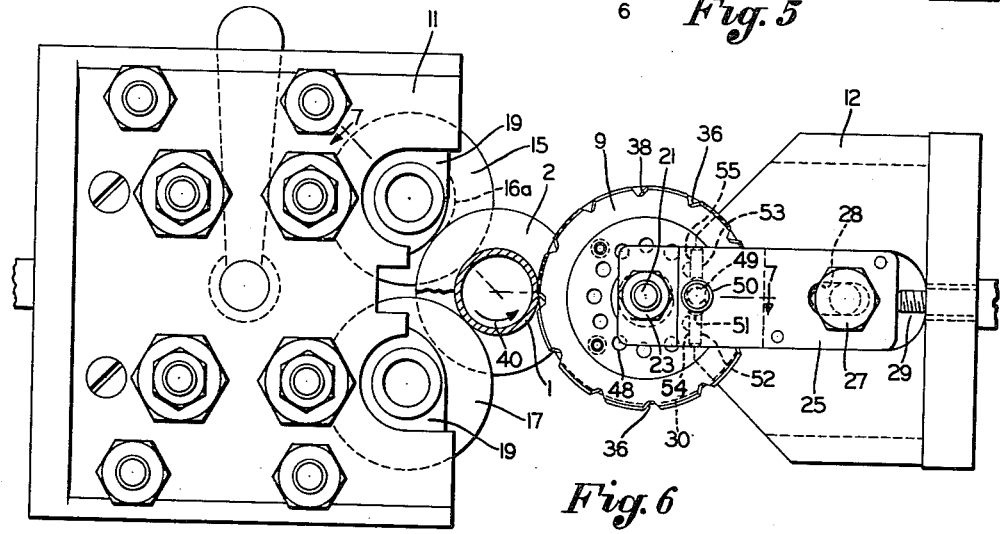
FIG. 6 is an enlarged vertical sectional view taken on the line 6—6 of FIG. 5.

The apparatus by which the foregoing finning operation is performed is shown in FIG. 5. The tube 1 is mounted on a lathe 6 between a live center 7 and a dead center 8. The tube is grooved by a groooving disk 9 (FIG. 9) which is mounted on a tool support 10 (FIGS. 5 and 6). As shown in FIG. 5, the tool carriage 10 includes a pair of tool posts 11 and 12 on opposite sides of the tube 1. The tool carriage 10 is driven in usual manner by a lead screw 13.

Figure 4:
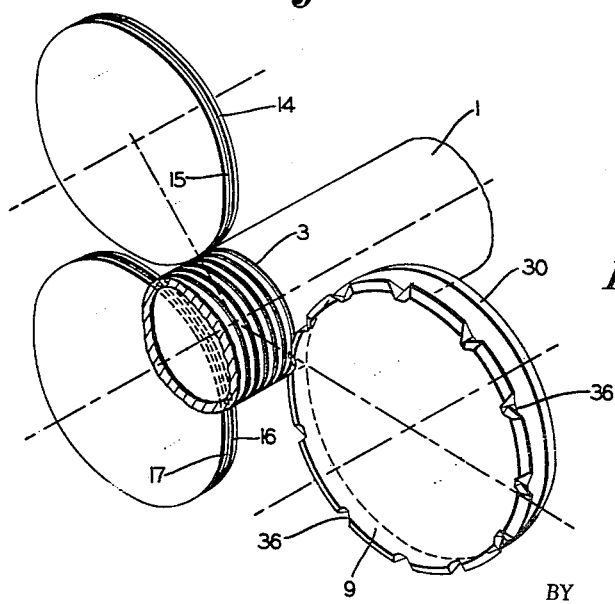
FIG. 4 is a diagrammatic perspective view showing the tube disposed between two pairs of backup rolls and the grooving and depth gauge disks.
Figure 7:
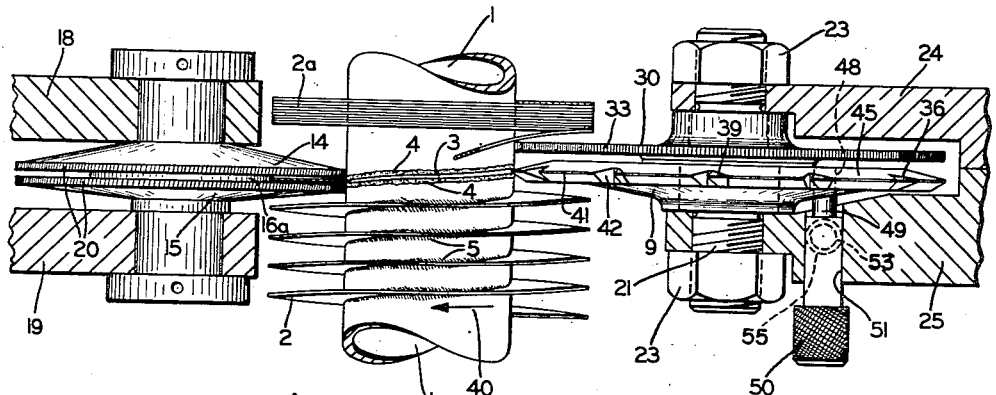
FIG. 7 is a sectional view taken on the line 7—7 of FIG. 6.

In FIGS. 6 and 7 the tool post 11 supports a pair of lead rolls 14 and 15 and a pair of knurling rolls 16 and 17 (FIG. 4) which rolls contact and support the tube 1 at a location substantially opposite the grooving disk 9. Both pairs or rolls 14 and 15, 16 and 17 are mounted between bifurcated members 18 and 19 as a detachable part of the tool post 11. As shown in FIG. 7, the lead rolls 14 and 15 are tapered members in order to fit between successive convolutions of the spiral fin 2 and are provided with knurled peripheries 20 so that both rolls rotate in contact with the tube 1 during its rotation. The knurling rolls 16 and 17 are similarly tapered and knurled at their peripheries. In addition, the lead rolls 14 and 15 and the knurling rolls 16 and 17 are spaced from each other by a distance slightly greater than the thickness of the fin 2 so that the fin passes between each pair of rolls and is seated by compressor roll 16a in the groove 3 as shown in FIG. 7.

On the opposite side of the tube 1 the grooving disk 9 is mounted on a shaft 21 (FIG. 12), the ends of which are threaded at 22 and provided with nuts 23 for attachment to the support members 24 and 25, which in turn are secured on the tool post 12 by nut and bolt assemblies 26 and 27.

The assembly of the support members 24 and 25 is slidably mounted transversely of the axis of the shaft 21 and the members 24 and 25 are slotted at 28 to permit sliding movement between the support members with respect to the tool post 12. An adjustment screw 29 is secured in the tool post 12 and has its inner end in contact with the outer end of the support member 24 as shown in FIGS. 6 and 8.

In addition to the grooving disk 9 a depth gauge disk 30 is mounted on the shaft 21 as shown in FIGS. 7 and 8. The shaft 21 includes two mounting portions 31 and 32 (FIG. 12) on which the depth gauge disk 30 and grooving disk 9 are mounted, respectively. Inasmuch as the depth gauge disk 30 engages the surface of the tube 1, for which purpose it is provided with a knurled periphery 33, the disk rotates on the shaft portion 31 and the shaft is therefore provided with an oil hole 34 which extends radially towards the axis of the shaft where it communicates with a bore 35 through which oil may be provided. As shown in FIG. 13, the outer end of the bore 35 has a hexagonal shape to accommodate an Allen wrench to permit rotation of the shaft when necessary.

The grooving disk 9 is provided with a plurality of preferably equally spaced notches 36 as shown in FIG. 9. Each notch is provided with a grooving V-shaped surface having a pair of bevelled surfaces 37 and 38 which extend at an angle from their apex 39 substantially as shown in FIG. 11. Thus the bevelled surfaces 37 and 38 serve as plowing or separating means for providing the ridges 4 on opposite sides of the groove 3. Accordingly, when the grooving disk 9 is mounted for operation as shown in FIG. 6, the tube 1 is rotated counterclockwise in the direction of the narrow 40. The nonrotating disk 9 is moved into contact with the surface of the tube 1 and the grooving operation takes place as the bevelled surfaces 37 and 38 cut into the tube. The depth of cut is controlled by the depth gauge disk 30 so that the distance between the outer periphery of the disks 9 and 30 is a measure of the depth of the groove 3.

The bevelled or V-shaped configuration of the surfaces 37 and 38, together with the apex 39, provide the groove 3 which has slightly tapered side walls 3a and 3b and a bottom wall 3c. The apex 39 extends at an angle outwardly towards the periphery of the disk 9 where it joins a peripheral edge 41. The bevelled surfaces 37 which extend outwardly from the apex 39 are inclined preferably at a 60° angle to the disk 9. The angle of inclination of the apex 39 is preferably 42° with regard to the radius of the disk 9.

Thus, as the tube rotates counterclockwise (FIG. 6), the metal is displaced radially outwardly and laterally of the tube axis by the disk to form groove 3 and ridges 4.

Each notch 36 is shown as having the bevelled surfaces 37 and 38 along one inclined side therof. Although an outwardly inclined surface 42 is provided along the other side of the notch 36, such surface may likewise be formed with bevelled surfaces similar to those of 37 and 38 so that each notch may be provided with two operating sides rather than one as shown.

The grooving operation occurs without any separation of metal from the tube 1. As shown in FIG. 10, the disk 9 is preferably composed of an inner support 43 having a central bore 44 for mounting on the shaft 21, as well as an outer annular portion 45 in which the notches 36 are formed and which is composed of a hardened material or a carbide. The annular hardened portion 45 is mounted on the inner support 43 where it is retained by a holder ring 46 that is secured to the inner support by spaced screws 47.

After a particular notch 36 has been used for grooving the tube it wears sufficiently to justify the substitution of another notch 36 from time to time. For that purpose the disk 9 is provided with a number of spaced apertures 48 equal to the number of notches 36. When a particular notch 36 is set up for grooving it is mounted on the shaft 21 in a nonrotative manner where it is held in place by a pin 49, the inner end portion of which is seated in one of the apertures 48. Thus the pin 49 prevents the disk 9 from turning during the grooving operation.

As shown in FIGS. 6, 7, and 8, the pin 49 having a knurled head 50 is disposed in a vertically elongated slot 51 into which extends a pair of oppositely disposed set screws 52 and 53 which are threadedly seated in threaded bores 54 and 55, respectively. As shown in FIG. 6, the threaded bores 54 and 55 are aligned with each other above and below the slot 51 so that the groove disk may be rotated slightly on its shaft 21 for slight adjustments (of the order of a few thousandths of an inch) by minute shifting of the pin up and down within the slot by slight adjustments of the set screws 52 and 53. Accordingly, if after the grooving operation begins for a given notch 36, it is deemed desirable to change the angle of the pitch of the apex 39 the adjustment may be made by rotating the disk 9 slightly in the manner indicated.

In addition, when one notch 36 wears out and is replaced by another, the pin 49 may be removed sufficiently to rotate the disk 9 on its shaft 21 until the pin is seated in the next aperture 48.

Further adjustment of the grooving disk 9 may be made by rotation of the shaft 21 by inserting an Allen wrench into the hexagonal bore 35 (FIGS. 12 and 13). By rotating the shaft 21, the disk 9 may be moved outwardly or inwardly with respect to the axis of the depth gauge disk 30 because the disk 9 is mounted on the eccentric portion 32. Thus the depth of the cut of a particular notch may be varied at the surface of the tube 1 while maintaining the periphery 33 of the disk 30 at the desired depth with respect to said surface. Once the desired depth of cut is attained by rotating the shaft 21, the shaft may then be locked in place free from rotation by tightening the nuts 23 in place.

In operation, precoiled convolutions 2a of metal ribbon are mounted on the tube as shown in FIG. 7. As the tube is rotated counterclockwise in the direction of the arrow 40 (FIG. 7), the precoiled fin 2a passes across a space from a position on one side of the disk 30 into the space between the lead rolls 14 and 15. The rolls 14 and 15 guide and seat the inner or root edge of the precoiled fin 2a in the groove 3 and the knurling rolls 16 and 17 below the lead rolls 14 and 15 subsequently engage the ridges 4 and distort the same into tight-fitting contact with the inner edge portion of the fin as shown in FIG. 3.

The foregoing construction provides a grooving tool for the manufacture of finned heat exchanger tubes wherein external fins are attached to the tube by seating the fin in a groove provided therefor. The tool, being a disk, is provided with a plurality of spaced notches, each of which notches has a cutting edge for grooving the tube by plowing and displacing the material of the tube. The notches are used separately until the cutting surfaces become dull and in need of sharpening. Although each notch is disclosed as having only one cutting edge, it is understood that a notch may be provided with two cutting edges and thereby doubles the capacity of the disk for grooving tubes. That is, the non-grooving edge 42 is replaced by a grooving edge having inclined surfaces extending outwardly to opposite sides of the disk similar to the surfaces 37 and 38.

By using the device of the present invention, each notch when worn out may be quickly changed by turning the disk until the next unused notch it brought into place.

The notches may all be of the same dimension for providing a groove of a given size or the notches may be of different sizes for grooving tubes to different widths and shapes as may be desired. Thus, where one size notch is provided which is dependent upon the diameter and thickness of the tube, another notch in the same disk may be provided for a tube of different diameter and thickness.

Moreover, the cutting or grooving disk 9 forms the groove 3 by cutting in, separating, and displacing the metal outwardly and upwardly to form the ridges 4 on both sides of the thus-formed groove, without any inward displacement of the metal at the inside diameter of the tube. The cross-sectional area of the displaced metal in ridges 4 on both sides of the groove equals the area of the groove inward of the outer diameter of the tube. The cylindrical peripheral edge 41 of the disk forms the cylindrical bottom 3c of the groove. This groove bottom 3c receives the normally cylindrical edge of the fin seated in the groove, whereby satisfactory heat exchange contact between the tube and fin interfaces is provided. If the fin strip material is composed of a metal softer than the tube wall metal, the softer fin metal may be deformed by the harder metal of the tube wall when the ridges 4 are roller pressed and reshaped at 5 (FIG. 3) into contact with opposite sides of the fin, thereby securing the fin tightly in place.

Finally, the improved grooving tool construction of the present invention provides a plurality of spaced groove-cutting edges which may be quickly replaced successively when a cutting edge becomes worn and unsatisfactory. At the same time, the tool is so mounted on an eccentric shaft which facilitates adjustments for the depth of cut in relation to the depth of cut disk and thereby closely controls the limit of the cut of each groove. The changing of the disk from one groove to the next does not affect the depth of cut of the groove and thereby provides more uniform depth and shape which is not feasible with prior grooving bits and disks.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction shown.

Having now described the features, constructions and principles of the invention, the characteristics of the grooving tool for finned heat exchanger tubes and the advantageous, new and useful results provided; the new and useful discoveries, principles, parts, elements, combinations, subcombinations, structures and arrangements and mechanical equivalents obvious to those skilled in the art are set forth in the appended claims.

We claim:

1. A tool for grooving metal tubes by displacement of the outer tube surface including a grooving disk having opposite sides and having beveled peripheral portions at each side, the beveled portions forming a cylindrical peripheral edge surface, the disk having a plurality of notches at the periphery, each notch having tube-deforming wall means for forming a groove between two ridges of displaced tube metal in the tube surface, said wall means including at least one non-cutting grooving edge and a pair of inclined metal-forming surfaces extending outwardly from opposite sides of said edge to the corresponding beveled peripheral portion of the disk, the grooving edge being disposed in a cord of the disk and aligned with the cylindrical peripheral edge surface, the disk having a central mounting aperture, means for mounting the disk in a position for grooving a metal tube including a shaft in the mounting aperture, said shaft including a portion for receiving the central mounting aperture and said shaft also including an eccentric portion, and means for controlling the depth of a groove in the metal tube including a tube-engaging depth gauge disk rotatably mounted on the eccentric portion of the shaft and adjacent the grooving disk, and means for detachably securing the grooving disk on the shaft in a non-rotatable manner, whereby pressing the grooving edge and inclined metal-forming surfaces against the outer surface of the rotating tube causes the metal to flow radially outwardly into ridges from the axis of the tube on opposite sides of a groove formed by the grooving edge without cutting into and severing the crystalline structure of the metal.

2. The tool for grooving metal tubes as defined in claim 1 in which the means for mounting the grooving disk is provided with a number of apertures equal to and spaced at intervals corresponding to the number and spacing of the grooving notches, and in which a dowel pin is fixedly mounted adjacent the disk and is detachably seated in one of the apertures for retaining the disk against rotation on the shaft.

References Cited in the file of this patent

UNITED STATES PATENTS

| | | |
|---|---|---|
| 632,678 | Dock | Sept. 5, 1899 |
| 867,725 | Hemenway | Oct. 8, 1907 |
| 897,625 | Keel | Sept. 1, 1908 |
| 927,527 | Hanson | July 13, 1909 |
| 1,260,172 | Fenaux | Mar. 19, 1918 |
| 1,342,745 | Halstead | June 8, 1920 |
| 1,365,683 | Griffith | Jan. 18, 1921 |
| 1,413,326 | Dover | Apr. 18, 1922 |
| 1,740,604 | Kienzl | Dec. 24, 1929 |
| 1,930,161 | Dewald | Oct. 10, 1933 |
| 1,983,837 | Berwick | Dec. 11, 1934 |
| 2,004,388 | Dewald | June 11, 1935 |
| 2,154,326 | Dorin | Apr. 11, 1939 |
| 2,302,783 | Luers | Nov. 24, 1942 |
| 2,355,315 | MacBlane | Aug. 8, 1944 |
| 2,362,779 | Stevens | Nov. 14, 1944 |
| 2,401,208 | Walensky | May 28, 1946 |
| 2,734,573 | Bailey | Feb. 14, 1956 |
| 2,825,123 | Wozniak | Mar. 4, 1958 |

FOREIGN PATENTS

| | | |
|---|---|---|
| 124,260 | Great Britain | Sept. 12, 1918 |
| 346,157 | Germany | Dec. 24, 1921 |
| 589,514 | Great Britain | June 23, 1947 |